United States Patent
Matsuda et al.

(10) Patent No.: US 11,824,475 B2
(45) Date of Patent: Nov. 21, 2023

(54) MOTOR CONTROL DEVICE

(71) Applicant: DENSO CORPORATION, Kariya (JP)

(72) Inventors: Kenji Matsuda, Kariya (JP); Norihisa Imaizumi, Kariya (JP); Tatsuya Kakehi, Kariya (JP)

(73) Assignee: DENSO CORPORATION, Kariya (JP)

( * ) Notice: Subject to any disclaimer, the term of this patent is extended or adjusted under 35 U.S.C. 154(b) by 189 days.

(21) Appl. No.: 17/363,415

(22) Filed: Jun. 30, 2021

(65) Prior Publication Data
US 2021/0328539 A1 Oct. 21, 2021

Related U.S. Application Data

(63) Continuation of application No. PCT/JP2019/050349, filed on Dec. 23, 2019.

(30) Foreign Application Priority Data

Jan. 24, 2019 (JP) ................ 2019-010384

(51) Int. Cl.
H02P 29/68 (2016.01)
H02P 29/02 (2016.01)
H02M 1/32 (2007.01)

(52) U.S. Cl.
CPC ............ *H02P 29/68* (2016.02); *H02M 1/325* (2021.05); *H02P 29/02* (2013.01)

(58) Field of Classification Search
CPC .......... H02P 29/68; H02P 29/02; H02M 1/325
See application file for complete search history.

(56) References Cited

U.S. PATENT DOCUMENTS

| | | | |
|---|---|---|---|
| 10,097,172 B2* | 10/2018 | Joos ...................... | H03K 17/18 |
| 2004/0008457 A1* | 1/2004 | Iimura ................... | H02H 7/122 |
| | | | 361/18 |
| 2004/0178759 A1* | 9/2004 | Nakamura ......... | B60H 1/00428 |
| | | | 318/471 |
| 2008/0315815 A1* | 12/2008 | Serizawa ............ | H02P 29/0241 |
| | | | 318/458 |
| 2016/0208810 A1* | 7/2016 | Tse .......................... | F04D 25/06 |
| 2017/0244240 A1 | 8/2017 | Watanabe | |

FOREIGN PATENT DOCUMENTS

| | | |
|---|---|---|
| JP | 2009-240136 A | 10/2009 |
| JP | 2012-196054 A | 10/2012 |

* cited by examiner

*Primary Examiner* — Bickey Dhakal
(74) *Attorney, Agent, or Firm* — POSZ LAW GROUP, PLC

(57) ABSTRACT

A motor control device controls a motor. The motor control device is provided separate from the motor. The motor control device includes a switch provided in an electrical conduction path for the motor. The motor control device detects a temperature of the switch. The motor control device controls the switch between an on state and an off state.

10 Claims, 10 Drawing Sheets

MOTOR CONTROL DEVICE

CROSS REFERENCE TO RELATED APPLICATIONS

The present application is a continuation application of International Patent Application No. PCT/JP2019/050349 filed on Dec. 23, 2019, which designated the U.S. and claims the benefit of priority from Japanese Patent Application No. 2019-010384 filed on Jan. 24, 2019. The entire disclosures of all of the above applications are incorporated herein by reference.

TECHNICAL FIELD

The present disclosure relates to a motor control device.

BACKGROUND

A motor control device, which has been proposed, includes a temperature detection unit. The motor control device forcibly turns off a switch when a temperature of the switch detected by the temperature detection unit exceeds an overheat detection threshold value. When a predetermined restoration condition is satisfied, the forced off is released.

SUMMARY

The present disclosure provides a motor control device. The motor control device controls a motor. The motor control device is provided separate from the motor. The motor control device includes a switch provided in an electrical conduction path for the motor. The motor control device detects a temperature of the switch. The motor control device controls the switch between an on state and an off state.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
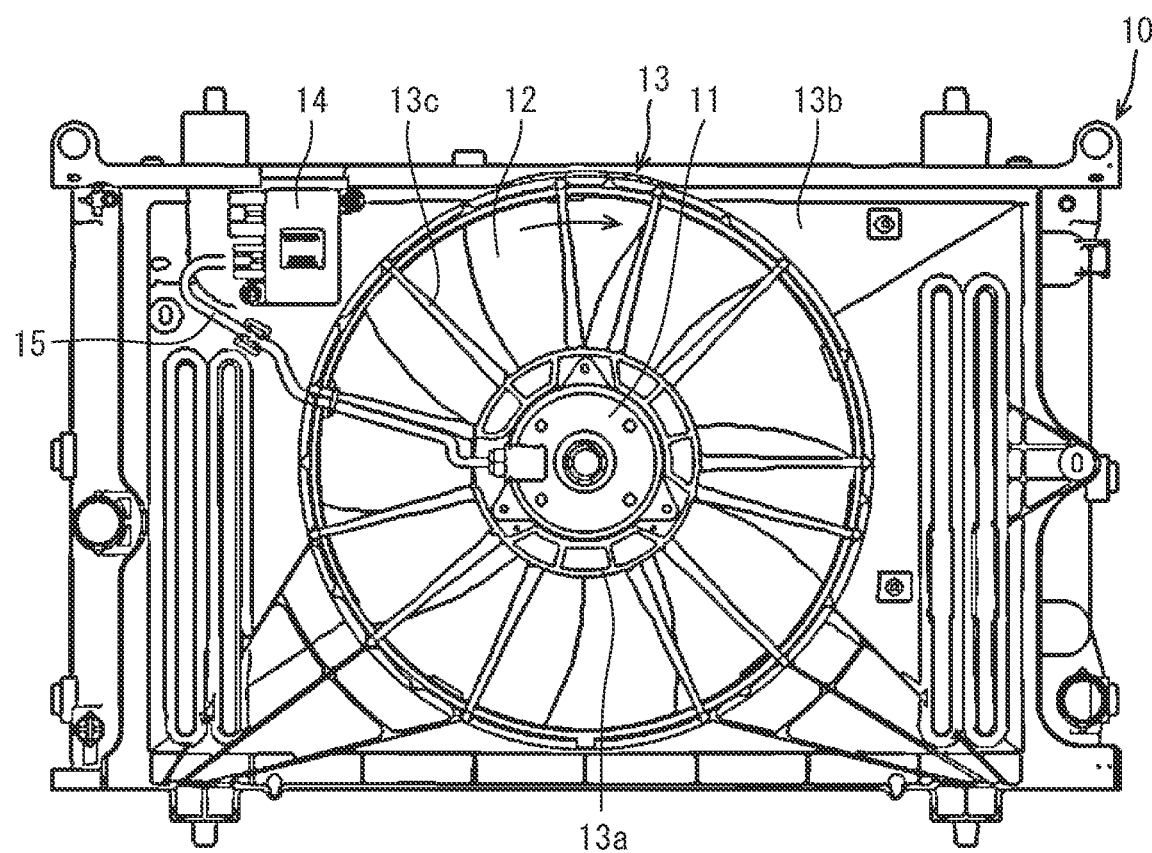
FIG. 1 is a diagram showing a schematic configuration of a radiator fan provided with a motor control device according to a first embodiment.

For example, when an abnormality that increases current flowing through a motor occurs, for example a motor lock, temperature of a switch rises. When the temperature exceeds an overheat detection threshold value due to the temperature rise, the switch is forcibly turned off. As a result, the temperature of the switch falls. The temperature of the switch repeats rising and falling while the anomaly continues.

The temperature of the motor does not change sharply like the switch. When the motor control device is separated from the motor, the temperature of the motor cannot be directly detected. Therefore, when the abnormality continues, the temperature of the motor may keep rising.

The present disclosure provides a motor control device capable of suppressing a temperature rise of a motor in a configuration separate from the motor.

An exemplary embodiment of the present disclosure provides a motor control device. The motor control device is configured to control a motor and provided separate from the motor. The motor control device includes a switch, a temperature detection unit, and a control unit. The switch is provided in an electrical conduction path for the motor. The temperature detection unit is configured to detect a temperature of the switch. The control unit is configured to control the switch between an on state and an off state, forcibly turn off the switch when the temperature detected by the temperature detection unit exceeds an overheat detection threshold value, and release a forced off state of the switch when a predetermined restoration condition is satisfied. When a predetermined switching condition is satisfied in response to the detected temperature exceeding the overheat detection threshold value, the control unit continues a drive of the motor while suppressing an electrical conduction to the motor more than before the switching condition is satisfied.

In the exemplary embodiment of the present disclosure, the switching condition can be satisfied at the time of abnormality in which the current flowing to the motor increases and the switch temperature rises. According to the motor control device of the present disclosure, when the switching condition is satisfied, the control unit controls the switch so as to continue driving of the motor while suppressing the electrical conduction to the motor more than before the switching condition is satisfied. As a result, when the abnormality in which the current increases continues, the heat generation of the motor is suppressed while the driving of the motor is continued. Therefore, it is possible to suppress the temperature rise of the motor.

Embodiments will be described with reference to the drawings. In the multiple embodiments, functionally and/or structurally corresponding parts and/or associated parts are given the same reference numerals. For corresponding parts and/or associated parts, additional explanations can be made to the description of other embodiments.

First Embodiment

A motor control device controls, for example, a motor mounted on a vehicle. A motor control device applied to a radiator fan of a vehicle will be described below as an example. First, a schematic configuration of the radiator fan provided with the motor control device will be described.

(Radiator Fan)

The radiator fan is arranged on the rear side of the radiator in the vehicle. The rear side indicates a rearward of the vehicle. As shown in FIG. 1, the radiator fan 10 includes a motor 11, a blade 12, a shroud 13, and a motor control device 14.

In this embodiment, a DC motor is used as the motor 11. The blade 12 is connected to a rotational axis shaft of the motor 11. A plurality of blades 12 are connected to the rotational axis along the circumferential direction. The blade 12 is also referred to as a fan. When the blade 12 is rotated by the drive of the motor 11, air in the vicinity of the radiator is sucked in. The blade 12 increases heat dissipation efficiency of the radiator.

The motor 11 is fixed to a support plate 13a of the shroud 13. The shroud 13 is a support member that supports the motor 11. The shroud 13 has a cover 13b. The cover 13b is arranged to face the radiator, and has a facing portion that covers the radiator and a tubular portion that accommodates the blade 12. The tubular portion extends in the direction of the rotational axis. In the cover 13b, the facing portion is connected to one end of the tubular portion. A support plate 13a is connected to the other end of the tubular portion via a stay 13c. In the projection view from the axial direction, the support plate 13a is arranged in the cylinder of the cover 13b.

The motor control device 14 is also referred to as a controller. The motor control device 14 is attached to the cover 13b of the shroud 13. The motor control device 14 is fixed to the shroud 13 at a position away from the motor 11. The motor control device 14 is electrically connected to the motor 11 via a wiring 15. The wiring 15 is a power supply line to the motor 11. The configuration of the motor control device 14 will be described.

(Motor Control Device)

Figure 2:
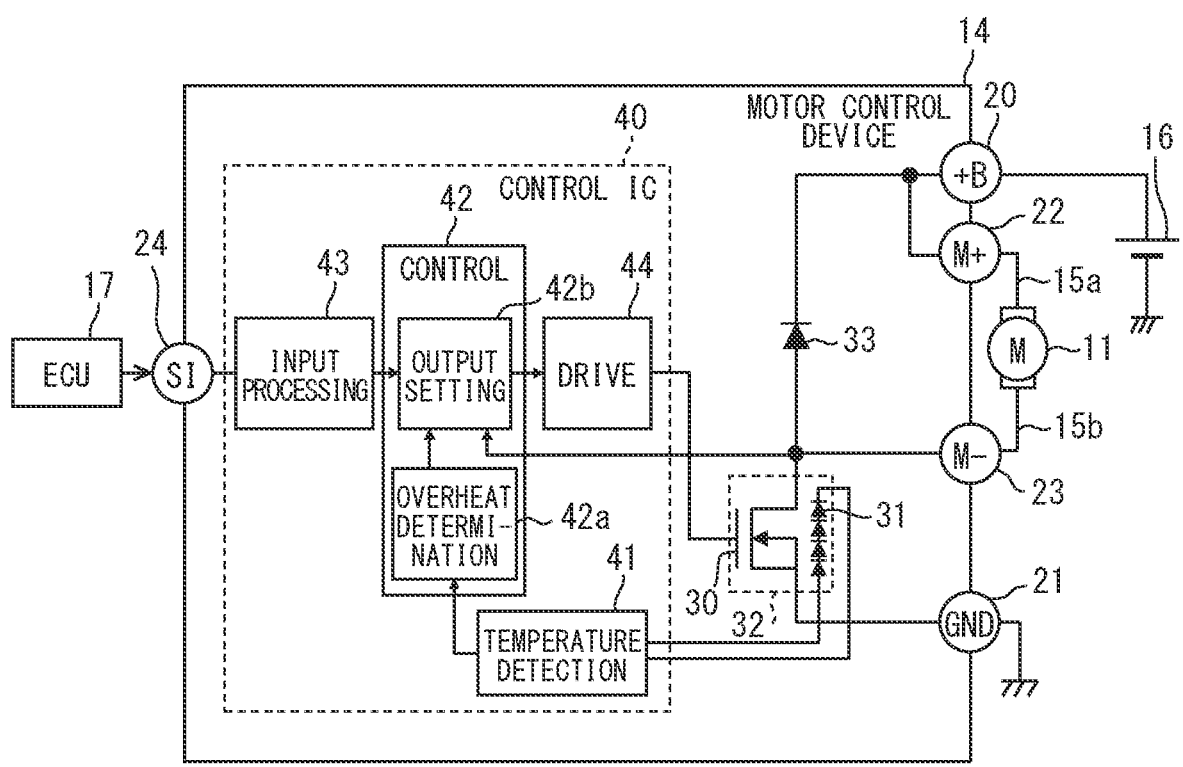
FIG. 2 is a diagram showing the motor control device.

As shown in FIG. 2, the motor control device 14 includes a plurality of terminals for external connection. The motor control device 14 includes a +B terminal 20, a GND terminal 21, an M+ terminal 22, an M− terminal 23, and an SI terminal 24 as terminals. In FIG. 2, the motor control device 14 is connected to the motor 11 and the battery 16.

The +B terminal 20 is connected to a positive electrode terminal of the battery 16. The GND terminal 21 is connected to the ground (ground potential). The GND terminal 21 is connected to a negative electrode terminal of the battery 16. The battery 16 is a DC power source mounted on the vehicle. The M+ terminal 22 and the M− terminal 23 are provided in an electrical conduction path between the +B terminal 20 and the GND terminal 21.

The M+ terminal 22 is electrically connected to the +B terminal 20. The terminal on the high potential side of the motor 11 is connected to the M+ terminal 22. The terminal on the low potential side of the motor 11 is connected to the M− terminal 23. The motor 11 is provided between the M+ terminal 22 and the M− terminal 23 in the electrical conduction path. The electrical conduction path is a power supply path to the motor 11. A part of the electrical conduction path is provided inside the motor control device 14, and the rest of the electrical conduction path is provided outside the motor control device 14.

The wiring 15 described above constitutes a part of the of the electrical conduction path. The wiring 15 includes a power supply side wiring 15a and a ground side wiring 15b. The M+ terminal 22 is electrically connected to the motor 11 via the power supply side wiring 15a. The M− terminal 23 is electrically connected to the motor 11 via the ground side wiring 15b.

A signal for controlling the motor 11 is input to the SI terminal 24 from an Electronic Control Unit (ECU) 17, which is a device different from the motor control device 14. The ECU 17 is configured with a microcomputer or the like as a main body. The microcomputer includes, as a processor, a CPU, a ROM, a RAM, a register, and the like. The ECU 17 outputs a signal corresponding to a voltage to be applied to the motor 11, that is, a signal corresponding to a target voltage based on at least the temperature of the cooling water circulating in the radiator. When the ECU 17 outputs a signal corresponding to the target voltage, the ECU 17 may refer to information on the air conditioner mounted on the vehicle. The information may include information on the pressure rise of the refrigerant of the air conditioner.

The motor control device 14 includes a switch 30, a temperature sensitive diode 31, and a control IC 40. The switch 30 is provided in the electrical conduction path. The switch 30 of this embodiment is provided between the M-terminal 23 and the GND terminal 21. The switch 30 is arranged on the downstream side (low side) with respect to the motor 11. In addition, an n-channel type MOSFET is adopted as the switch 30. The drain of the switch 30 is electrically connected to the M− terminal 23, and the source is electrically connected to the GND terminal 21.

The temperature sensitive diode 31 is an element for detecting the temperature of the switch 30. The temperature sensitive diode 31 is provided on a semiconductor chip 32 common to the switch 30.

In the motor control device 14, a regenerative element 33 is provided between the M− terminal 23 and the M+ terminal 22. The regenerative element 33 is connected in parallel to the motor 11 which is an inductive load. In this embodiment, a diode is used as the regenerative element 33. The anode of the regenerative element 33 is connected to the M− terminal 23 and the drain of the switch 30, and the cathode is connected to the M+ terminal 22. The regenerative element 33 is also referred to as a reflux element.

The control IC 40 includes a temperature detection unit 41, a control unit 42, an input processing unit 43, and a drive unit 44. In this embodiment, an ASIC is adopted as the control IC 40.

The temperature detection unit 41 is electrically connected to the anode and cathode of the temperature sensitive diode 31. The temperature detection unit 41 detects the temperature of the switch 30 based on the forward voltage Vf of the temperature sensitive diode 31. The temperature of the switch 30 is detected by the temperature sensitive diode 31 and the temperature detection unit 41. The temperature of the switch 30 detected by the temperature sensitive diode 31 and the temperature detection unit 41 corresponds to a detected temperature. The temperature detection unit 41 is also referred to as a temperature detection circuit.

The control unit 42 controls an on-off state of the switch 30. The control unit 42 controls the voltage applied to the motor 11 by controlling the on-off state of the switch 30. The control unit 42 sets a duty ratio of the signal for outputting to the gate of the switch 30. The control unit 42 has an overheat determination function. The control unit 42 has an overheat determination unit 42a and an output setting unit 42b. The control unit 42 is also referred to as a control circuit or control logic.

The overheat determination unit 42a compares the temperature of the switch 30 detected by the temperature detection unit 41 with a temperature threshold value, and outputs a signal based on the comparison result to the output setting unit 42b. The overheat determination unit 42a of the present embodiment includes a comparator that compares the temperature of the switch 30 with the temperature threshold value. The overheat determination unit 42a is capable of switching the temperature threshold value for one comparator. As the temperature threshold values, a first threshold value and a second threshold value, which are the overheat detection threshold values, and a restoration threshold value can be set. In addition to the comparator, the overheat determination unit 42a includes, for example, a counter that counts the number of overheat detections and a latch circuit that latches off the switch 30.

The output setting unit 42b acquires a signal corresponding to the target voltage via the input processing unit 43. The output setting unit 42b acquires the voltage of the M-terminal 23, that is, the actual voltage applied to the motor 11. The output setting unit 42b acquires a signal based on the temperature comparison result from the overheat determination unit 42a.

In a normal state that is not an overheated state, the output setting unit 42b performs a normal control. The output setting unit 42b performs a feedback control, for example, a PI control so that the actual voltage follows the target voltage. As a result, the output setting unit 42b sets the duty ratio. On the other hand, in the overheated state, the output setting unit 42b forcibly turns off the switch 30. When a predetermined restoration condition is satisfied, the output setting unit 42b releases the forced off of the switch 30. That is, the control is restored to the normal control. The details of the processing performed by the control unit 42 will be described later.

The drive unit 44 generates a PWM signal based on the duty ratio set by the output setting unit 42b, and outputs the PWM signal to the gate of the switch 30. The drive unit 44 is also referred to as a drive circuit. Next, the processing performed by the control unit 42 will be described.

(Processing Performed by Control Unit)

Figure 3:
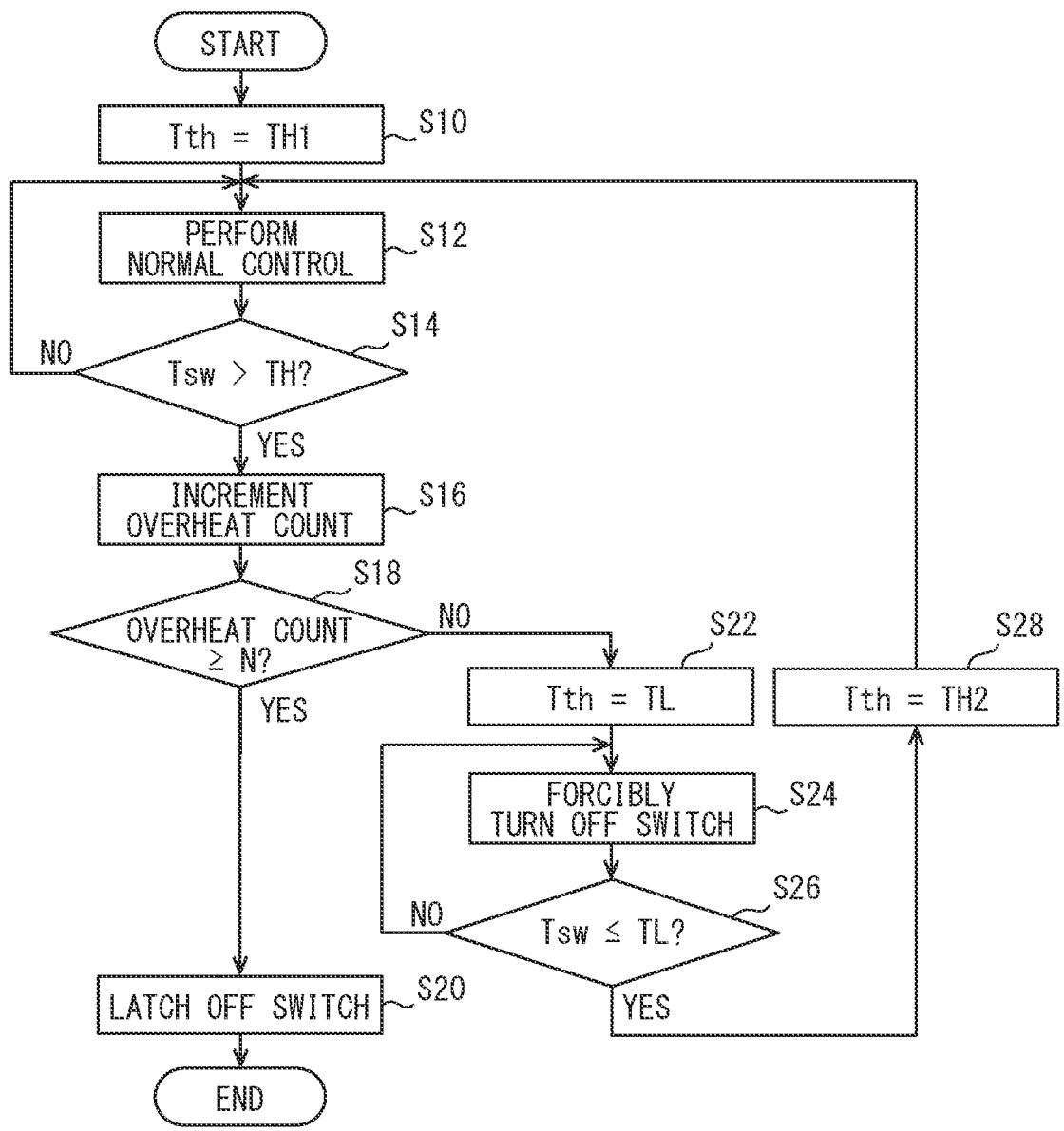
FIG. 3 is a flowchart showing processing to be performed by a control unit.

When the power of the motor control device 14 is turned on, the control unit 42 performs the processing shown in FIG. 3.

As shown in FIG. 3, the overheat determination unit 42a of the control unit 42 sets the first threshold value TH1 which is the overheat detection threshold value TH as the temperature threshold value Tth of the comparator (S10). The overheat detection threshold value TH is a temperature threshold value Tth for determining an overheat abnormality. The first threshold value TH1 is initially set by an initialization process including a reset immediately after the power is turned on. The first threshold value TH1 which is an initial value is set to be higher than a second threshold value TH2 which is another overheat detection threshold value.

Next, the output setting unit 42b of the control unit 42 performs a normal control (S12). The output setting unit 42b acquires the target voltage through the input processing unit 43. The output setting unit 42b also acquires the actual voltage applied to the motor 11. Then, a feedback control is performed such that the actual voltage follows the target voltage, and the duty ratio is set. The control unit 42 outputs the set duty ratio to the drive unit 44.

Next, the overheat determination unit 42a of the control unit 42 determines whether the temperature Tsw of the switch 30 exceeds the overheat detection threshold value TH (S14). The overheat determination unit 42a acquires the temperature Tsw of the switch 30 from the temperature detection unit 41 and compares the temperature with the overheat detection threshold value TH. The overheat detection threshold value TH in S14 is the first threshold value TH1 at the time when the processes after S16 described later are not performed. When the processes after S16 ate performed, the overheat detection threshold value TH in S14 is the second threshold value TH2.

When an abnormality in which the current flowing through the motor 11 increases occurs, such as a motor lock, the switch temperature Tsw rises and exceeds the overheat detection threshold value TH. The control unit 42 repeats the processes of S12 and S14 until the switch temperature Tsw exceeds the overheat detection threshold value TH. In other words, the control unit 42 performs the normal control as long as the overheat abnormality does not occur.

In S14, when the switch temperature Tsw exceeds the overheat detection threshold value TH, the overheat determination unit 42a of the control unit 42 increments the count number of the overheat detection counter (S16). When the overheat determination unit 42a detects an overheat abnormality, the overheat count is incremented by 1. The overheat detection counter counts the number of overheat abnormality detections after the power is turned on.

Next, the overheat determination unit 42a of the control unit 42 determines whether the overheat count has reached a predetermined number of times N (S18). The predetermined number of times N is set in consideration of the temperature rise of the motor 11 due to the continuation of the overheat abnormality. For example, dozens of times are set.

When the overheat count is equal to or more than a predetermined number of times N, the overheat determination unit 42a outputs a latch stop signal assuming that the latch stop condition is satisfied. As a result, the output setting unit 42b latches off the switch 30 (S20). The control unit 42 continues to stop the switch 30 until the power is turned off and a series of processes is completed. The latch stop is released by resetting.

In S18, when the overheat count is less than the predetermined number of times N, the overheat determination unit 42a of the control unit 42 sets the restoration threshold value TL as the temperature threshold value Tth (S22). The restoration threshold value TL is a temperature threshold value Tth for determining the restoration from forced off due to overheating to the normal control. The restoration threshold value TL is set to be lower than the overheat detection threshold value TH. That is, the restoration threshold value TL is set to be lower than the first threshold value TH1 and the second threshold value TH2. The overheat detection threshold value TH is also referred to as an upper limit threshold value, and the restoration threshold value TL is also referred to as a lower limit threshold value.

Next, the output setting unit 42b of the control unit 42 forcibly turns off the switch 30 (S24). The output setting unit 42b sets the duty ratio to 0%. As a result, the electrical conduction of the motor 11 is cut off.

Next, the overheat determination unit 42a of the control unit 42 determines whether the switch temperature Tsw is equal to or less than the restoration threshold value TL (S26). The overheat determination unit 42a acquires the switch temperature Tsw from the temperature detection unit 41 and compares the temperature with the restoration threshold value TL. The control unit 42 repeats the processes of S24 and S26 until the switch temperature Tsw becomes equal to or lower than the restoration threshold value TL.

Due to the forced off, no current flows through the motor 11, and the switch temperature Tsw falls. In S26, when the switch temperature Tsw is equal to or less than the restoration threshold value TL, the overheat determination unit 42a of the control unit 42 sets the second threshold value Tth2, which is the overheat detection threshold value TH, as the temperature threshold value Tth (S28). When the process of S28 is the first time after the power is turned on, the process of S28 switches the overheat detection threshold value TH from the first threshold value TH1 to the second threshold value TH2.

After performing the process of S28, the control unit 42 performs the process of S12 and the processes thereafter again. Since the second threshold value TH2 is set in S28, the switch temperature Tsw is compared with the second threshold value TH2 in S14.

(Effect of Motor Control Device)

Figure 4:
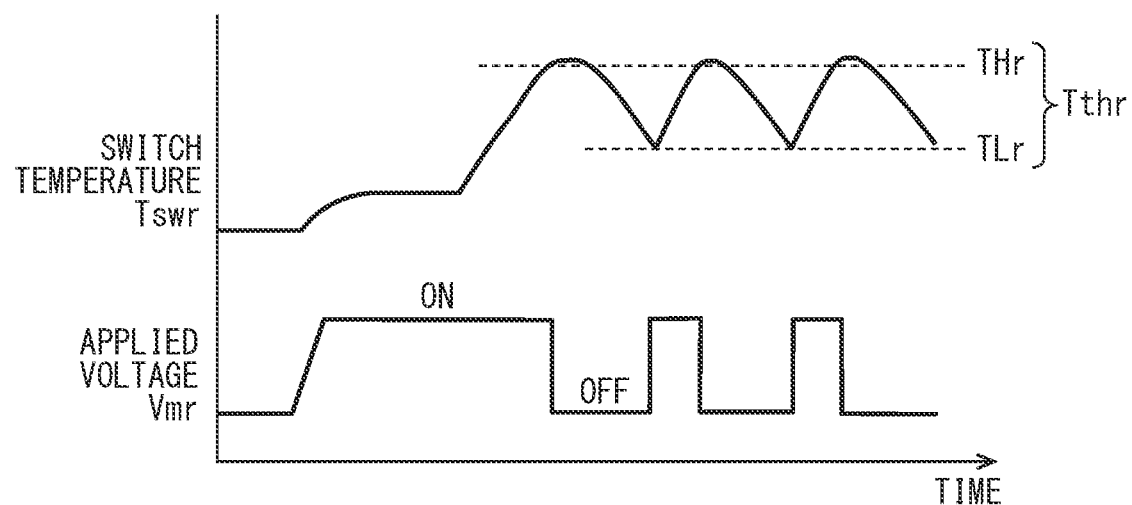
FIG. 4 is a timing chart of a reference example.

FIG. 4 shows a timing chart of a reference example. In the reference example, r is added at the end of the elements related to the elements of the present embodiment. In the reference example, a motor control device is separated from a motor. The reference example has only one overheat detection threshold value THr as a temperature threshold value Tthr.

When an abnormality in which the current flowing through the motor increases, that is, abnormal heat generation occurs, a switch temperature Tswr rises. As shown in FIG. 4, when the switch temperature Tswr exceeds the overheat detection threshold value THr, the switch is forcibly turned off and the electrical conduction of the motor is cut off. That is, an applied voltage Vmr of the motor is turned off. When the switch temperature Tswr falls due to the forced off and becomes equal to or lower than the restoration threshold value TLr, the forced off of the switch is released. As a result, the normal control is restored, and the applied voltage Vmr of the motor is turned on. When the abnormality continues, the switch temperature Tswr rises again and exceeds the overheat detection threshold value THr, and the switch is forcibly turned off.

Figure 5:
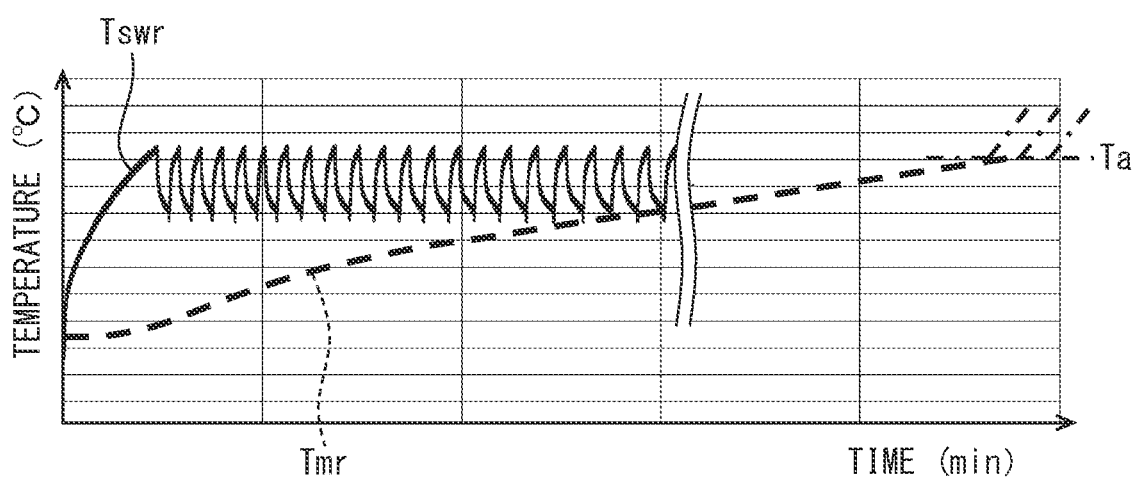
FIG. 5 is a diagram showing a temperature change of the reference example.

FIG. 5 shows the changes of the switch temperature Tswr and the motor temperature Tmr over time. FIG. 5 is actual measurement data. In FIG. 5, the motor temperature Tmr is shown by a broken line. In FIG. 5, for convenience, the illustration of the switch temperature Tswr after a predetermined time has elapsed from the occurrence of the abnormality is omitted.

As shown in FIG. 5, the switch temperature Tswr repeats rising and falling. On the other hand, the temperature Tmr of the motor does not change sharply like the switch. In the case of a separate body, the motor control device cannot directly detect the motor temperature Tmr. Further, when a low value is set as the overheat detection threshold value THr, it becomes easy to erroneously detect a normal state in which no abnormality has occurred as an overheat state. Therefore, when the abnormality continues, as shown in FIG. 5, the motor temperature Tmr may continue to rise and reach the permissible temperature Ta of the motor. The permissible temperature Ta is an endurance limit temperature of a portion of the motor having low heat resistance, or a temperature obtained by adding a predetermined margin to the endurance limit. The motor temperature Tmr is the ambient temperature of the portion having low heat resistance.

Figure 6:
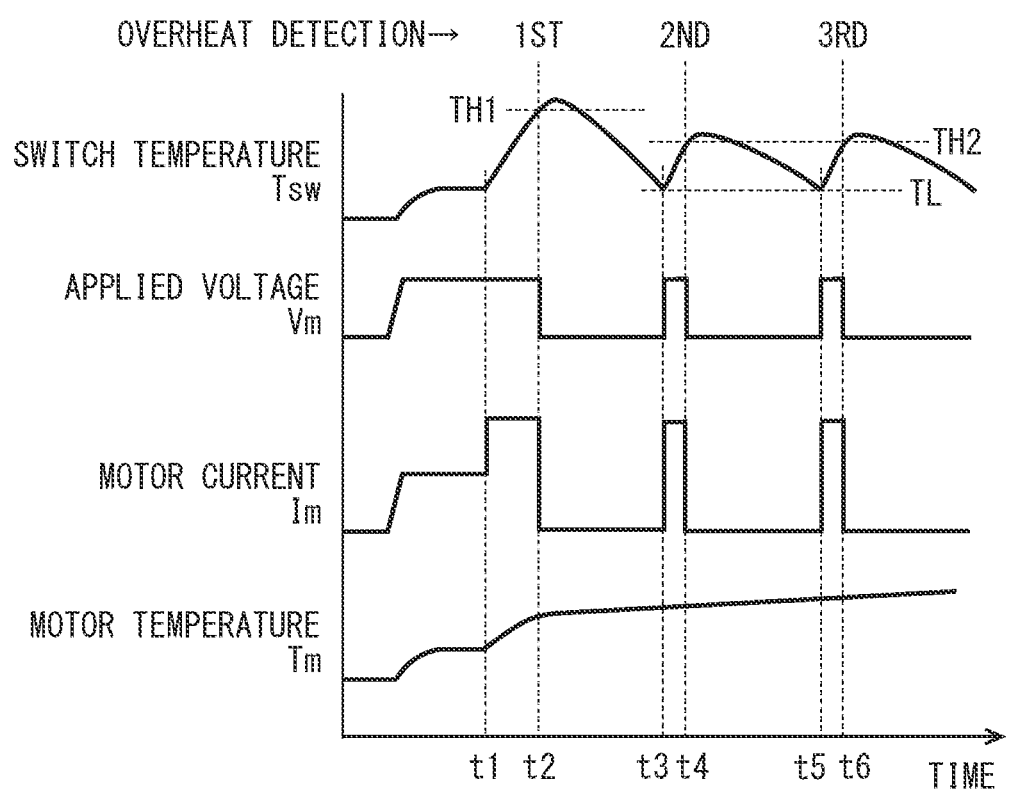
FIG. 6 is a timing chart of the first embodiment.

FIG. 6 shows a timing chart of the present embodiment. An example is shown in which an abnormality in which the motor current Im increases occurs, such as a motor lock, at a time point t1 shown in FIG. 6, and this abnormality continues. In FIG. 6, the voltage Vm applied to the motor 11 is constant.

At the time point t1, an abnormality of current increase occurs, the heat generation value of the switch 30 increases, and at a time point t2, the switch temperature Tsw exceeds the first threshold value Th1 that is initially set. As the motor current Im increases, the heat generation value of the motor 11 also increases, and the motor temperature Tm also rises with a large inclination between the time point t1 and the time point t2.

At the time point t2, the switch 30 is forcibly turned off. As a result, the electrical conduction is cut off. The applied voltage Vm and the motor current Im become zero. Since the motor current Im does not flow, the switch temperature Tsw falls. At a time point t3, the switch temperature Tsw becomes equal to or less than the restoration threshold value TL, and the forced off of the switch 30 is released.

At the time point t3, the normal control is restored. As a result, the electricity of the motor 11 is conducted. Since the abnormality continues, the switch temperature Tsw rises again, and at a time point t4, the switch temperature Tsw exceeds the second threshold value Th2. Since the overheat detection threshold value TH has been switched to the second threshold value TH2, which is lower than the first threshold value TH1, the switch temperature Tsw exceeds the overheat detection threshold value TH (that is, the second threshold value TH2) in a short time after restoring. The period from the time point t3 to t4 is shortened as compared with the case where the overheat detection threshold value TH is maintained as the first threshold value TH1.

At the time point t4, the switch 30 is forcibly turned off. As a result, the motor current Im is cut off, and the switch temperature Tsw falls. At a time point t5, the switch temperature Tsw becomes equal to or less than the restoration threshold value TL again, and the forced off of the switch 30 is released. Since the abnormality continues, the switch temperature Tsw rises again by the normal control, and the switch temperature Tsw exceeds the second threshold value Th2 at a time point t6. As with the period from the time point t3 to t4, the period from the time point t5 to t6 is also shortened.

The motor 11 generates a greater amount of heat than the switch 30. The heat capacity of the motor 11 is greater than that of the switch 30. Therefore, the motor temperature Tm does not change as steeply as the switch temperature Tsw. Therefore, the motor temperature Tm rises after the time point t2 with a gentle slope than the period from the time point t1 to t2. Further, for the reasons described above, the length of the time during which the switch 30 is forcibly turned off, for example, the period from the time point t2 to t3 does not have a great influence on the motor temperature Tm. Even when the off time is lengthened, the slope of the motor temperature Tm does not change significantly.

In the present embodiment, when a predetermined switching condition based on the switch temperature Tsw exceeding the overheat detection threshold value TH is satisfied, the control unit 42 (overheat determination unit 42a) sets the overheat detection threshold value TH from the first threshold value TH1 to the second threshold value TH2. The switching condition can be satisfied at the time of abnormality in which the motor current Im increases and the switch temperature Tsw rises. By switching to the second threshold value TH2, which is lower than the first threshold value TH1, the overheat detection can be performed in a shorter time than when continuing at the first threshold value TH1. When the abnormality continues, the electrical conduction time will be shortened. In this way, when the switching condition is satisfied, the control unit 42 controls the switch 30 so as to continue driving the motor 11 while suppressing the electrical conduction of the motor 11 more than before the switching condition is satisfied. Therefore, the heat generation of the motor 11 can be suppressed by switching. As described above, the temperature rise of the motor 11 can be suppressed in the motor control device that is separate from the motor 11.

As described above, in the present embodiment, the switching condition is related to the number of times the switch temperature Tsw exceeds the overheat detection threshold value TH, that is, the number of times of overheat detection. For example, it is possible to set the switching condition to detect the overheat abnormality for a plurality of times. After switching to the second threshold value TH2, the time until overheat detection, that is, the electrical conduction time can be shortened.

In particular, in the present embodiment, when the overheat abnormality is detected once, there is possibility that the abnormality continues. Therefore, the overheat detection threshold value TH is switched from the first threshold value TH1 to the second threshold value TH2. With this configuration, when an overheat is detected, the threshold value can be switched to the second threshold value TH2 immediately. Therefore, when the abnormality continues, the second and subsequent overheat detections are performed with reference to the second threshold value TH2. As a result, the electrical conduction time can be shortened from the second overheat detection. Therefore, the heat generation of the motor 11 can be effectively suppressed. That is, the temperature rise of the motor 11 can be effectively suppressed.

Figure 7:
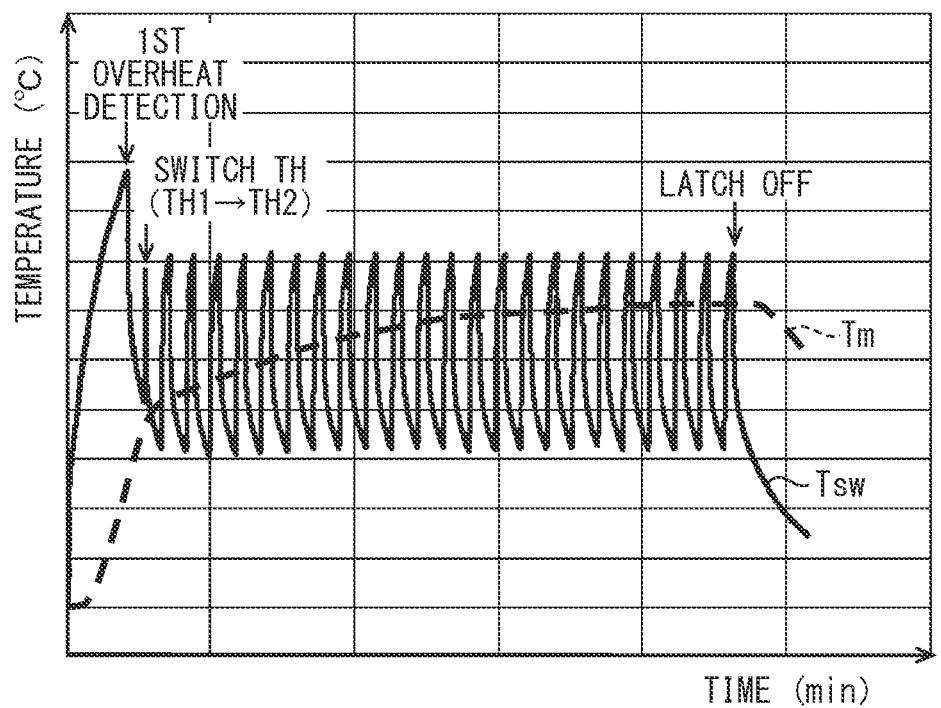
FIG. 7 is a diagram showing a temperature change in the first embodiment.
Figure 8:
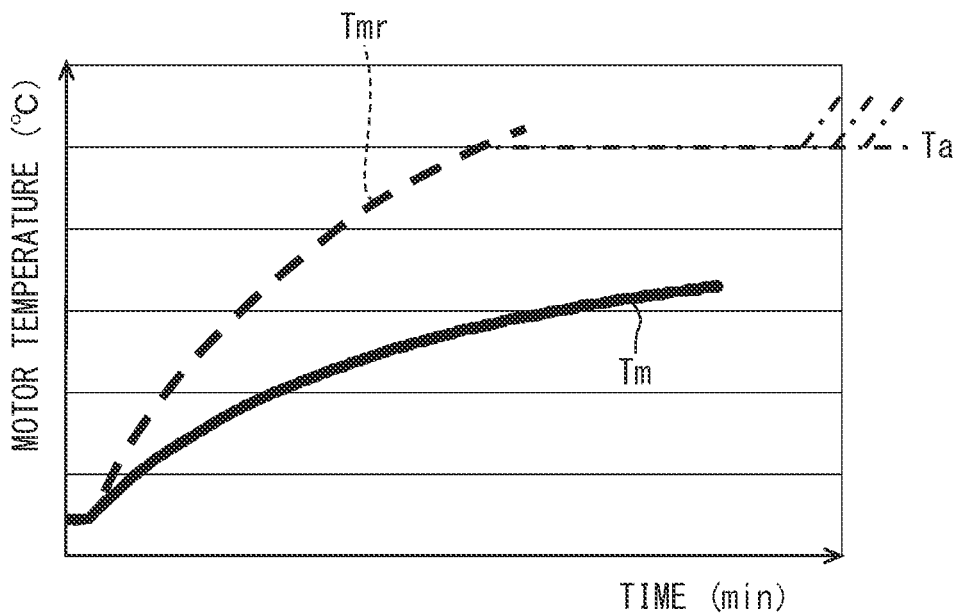
FIG. 8 is a diagram comparing the first embodiment and the reference example with respect to a motor temperature.

FIGS. 7 and 8 support the effect of this embodiment. FIG. 7 shows the changes of the switch temperature Tsw and the motor temperature Tm over time. FIG. 7 is actual measurement data. In FIG. 7, the motor temperature Tm is shown by a broken line. The first threshold value TH1 is initially set as the overheat detection threshold value TH. By the first overheat detection, the overheat detection threshold value TH is switched to the second threshold value TH2. From the second detection, overheating is detected by the second threshold value TH2. The switch is latched off by detecting the overheat abnormality for a predetermined number of times. By switching to the second threshold value TH2, the time from the restore to the overheat detection, that is, the electrical conduction time is shortened. As a result, the inclination of the motor temperature Tm is gentler than that before the switching. As a result, it is possible to gain time until the latch off with the gentle inclination. That is, it is possible to suppress the latch off as much as possible.

FIG. 8 is a diagram comparing the present embodiment and the reference example with respect to the motor temperature. FIG. 8 is also actual measurement data. In FIG. 8, the motor temperature Tmr of the reference example is shown by a broken line. In the reference example, the same value as the first threshold value TH1 of the present embodiment is maintained as the overheat detection threshold value TH. In FIG. 8, it is clear that the present embodiment in which the overheat detection threshold value TH is switched can effectively suppress the increase in the motor temperature when the abnormality continues, as compared with the reference example.

Second Embodiment

This embodiment is a modification example which is based on the preceding embodiment. In the above embodiment, when the switching condition is satisfied, the overheat detection threshold value TH is switched. Instead of this configuration, when the switching condition is satisfied, the applied voltage Vm may be switched together with the overheat detection threshold value TH.

Figure 9:
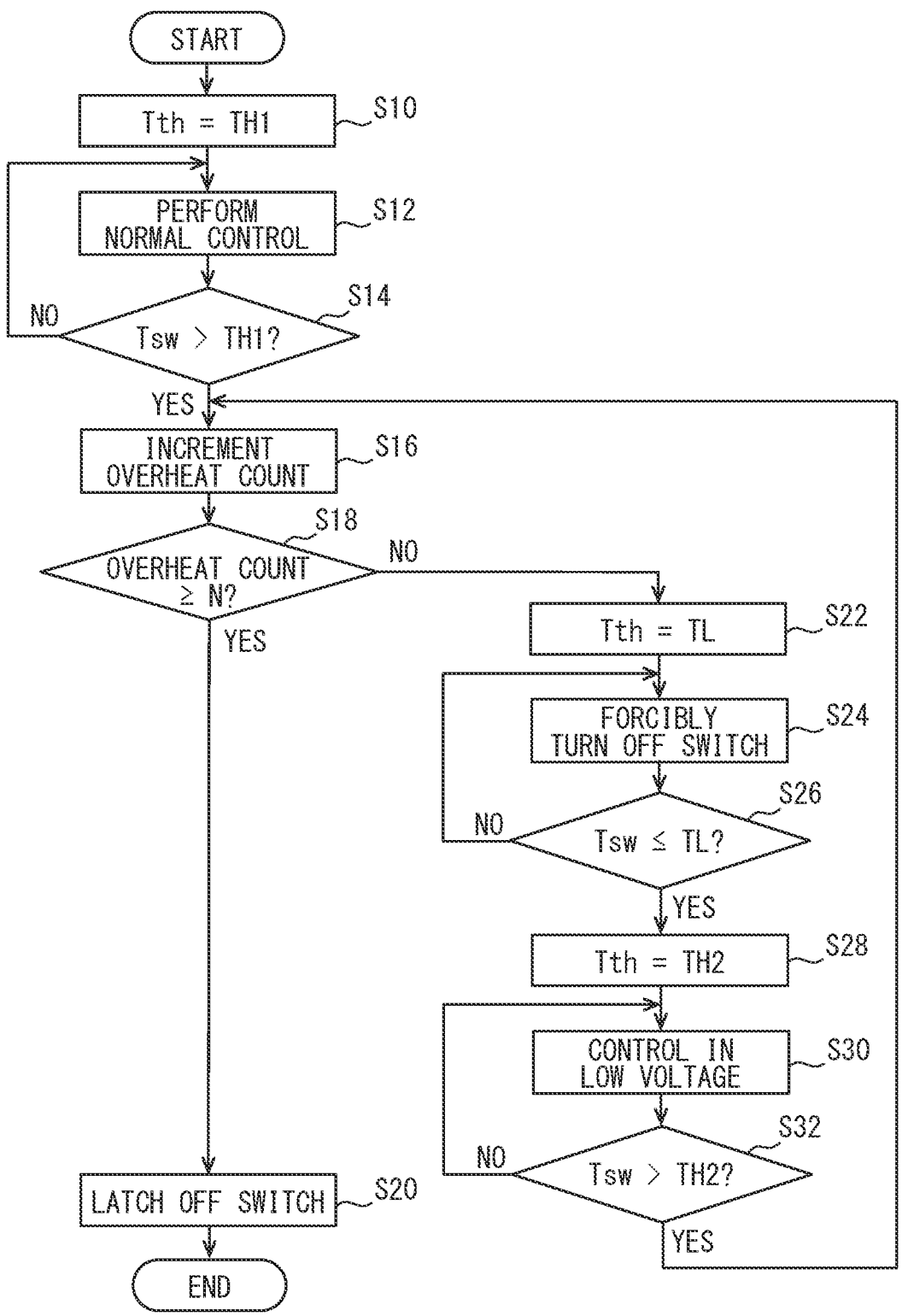
FIG. 9 is a flowchart showing processing performed by a control unit in a motor control device according to a second embodiment.

FIG. 9 is a flowchart showing processing to be performed by the control unit 42. The processes from S10 to S28 are basically the same as those of the preceding embodiment shown in FIG. 3. However, in the process of S14, the switch temperature Tsw and the first threshold value TH1 are compared, and the control unit 42 determines whether the switch temperature Tsw exceeds the first threshold value TH1.

Further, when the second threshold value Tth2 is set as the temperature threshold value Tth in S28, the control unit 42 then performs a low voltage control (S30). The control unit 42 sets the duty ratio so that the applied voltage Vm of the motor 11 is lower than the predetermined voltage by the normal control (for example, PI control). For example, a minimum drive duty ratio in which the motor 11 can drive may be set. Alternatively, the duty ratio calculated by the normal control may be multiplied by a predetermined coefficient so that the duty ratio and the applied voltage Vm are lowered.

As described above, in the present embodiment, the overheat detection threshold value TH is switched from the first threshold value TH1 to the second threshold value TH2, and the normal control is switched to the low voltage control.

Next, the overheat determination unit 42a of the control unit 42 determines whether the switch temperature Tsw exceeds the second threshold value TH2 (S32). The control unit 42 repeats the processes of S30 and S32 until the switch temperature Tsw exceeds the second threshold value TH2.

In S32, when the switch temperature Tsw exceeds the second threshold value TH2, the control unit 42 again performs the processes after S16.

Figure 10:
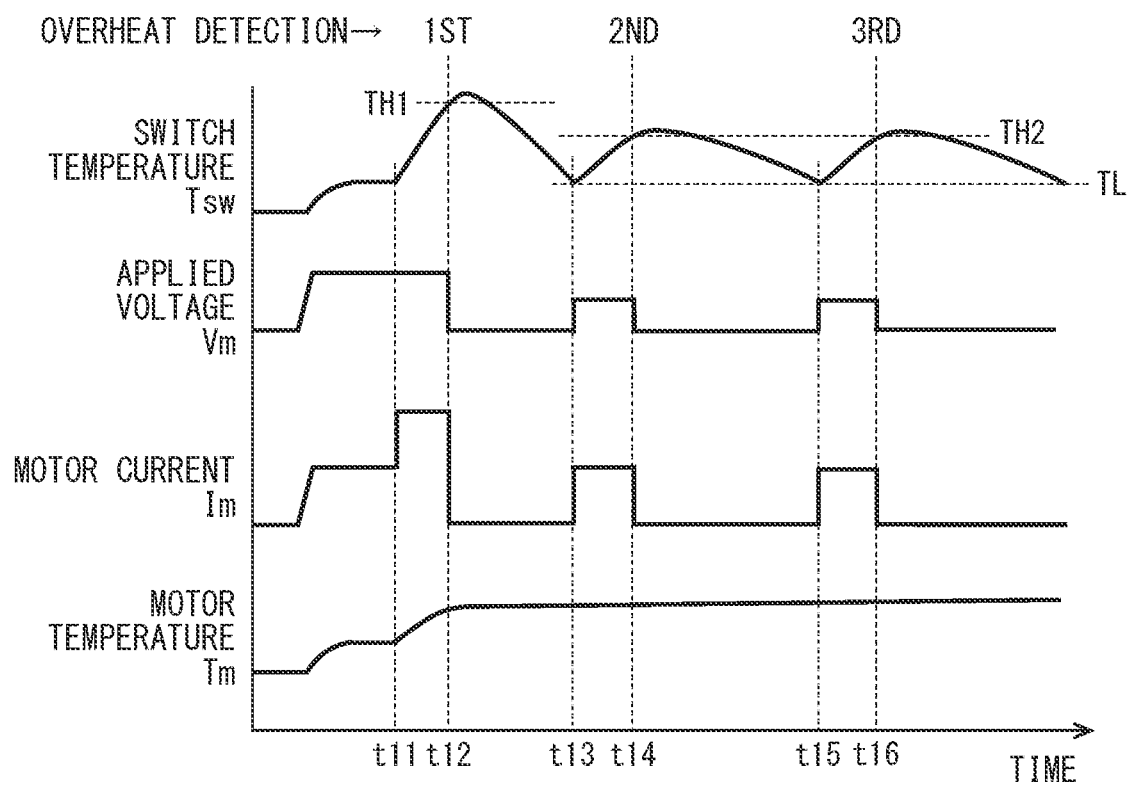
FIG. 10 is a timing chart.

FIG. 10 shows a timing chart of this embodiment. An example is shown in which an abnormality in which the motor current Im increases occurs at a time point t11 shown in FIG. 10, and this abnormality continues. The time points t11 to t16 correspond to the time points t1 to t6 of the preceding embodiment (see FIG. 6).

Up to a time point t13 is the same as up to the time point t3 shown in the preceding embodiment. At the time point t13, the switch temperature Tsw becomes equal to or less than the restoration threshold value TL, and the forced off of the switch 30 is released. In the present embodiment, the second threshold value TH2 is set as the temperature threshold value Tth, and the above described low voltage control is performed. As a result, the applied voltage Vm becomes lower than the value set by the normal control. The applied voltage Vm becomes lower than that before switching. Since the applied voltage Vm becomes low, the motor current Im also becomes small.

Since the abnormality continues, the switch temperature Tsw rises again, and at a time point t14, the switch temperature Tsw exceeds the second threshold value Th2. With this configuration, the switch 30 is forcibly turned off. As a result, the motor current Im is cut off, and the switch temperature Tsw falls. At a time point t15, the switch temperature Tsw becomes equal to or less than the restoration threshold value TL again, and the forced off of the switch 30 is released.

A second threshold value TH2 is set as the temperature threshold value Tth with the release of the forced off. Also, the low voltage control is performed. Since the abnormality continues, the switch temperature Tsw rises again, and at a time point t16, the switch temperature Tsw exceeds the second threshold value Th2. Similar to the period from the time point t13 to t14, the applied voltage Vm is lowered and the motor current Im is reduced in the period from the time point t15 to t16.

As described above, in the present embodiment, the overheat detection threshold value TH is switched from the first threshold value TH1 to the second threshold value TH2, and the normal control is switched to the low voltage control. After restoring from forced off due to the overheat detection, the motor current Im becomes small. Thereby, the heat generation of the motor 11 can be suppressed. By switching to the second threshold value TH2, the electrical conduction time can be shortened as compared with the case where the first threshold value TH1 is continuously used. Further, as shown in FIG. 10, an increase in the motor temperature Tm can be suppressed more effectively.

Third Embodiment

This embodiment is a modification example which is based on the preceding embodiment. In the above described embodiment, when the switching condition is satisfied, the applied voltage Vm is switched together with the overheat detection threshold value TH. Instead of this configuration, when the switching condition is satisfied, only the applied voltage Vm may be switched.

Figure 11:
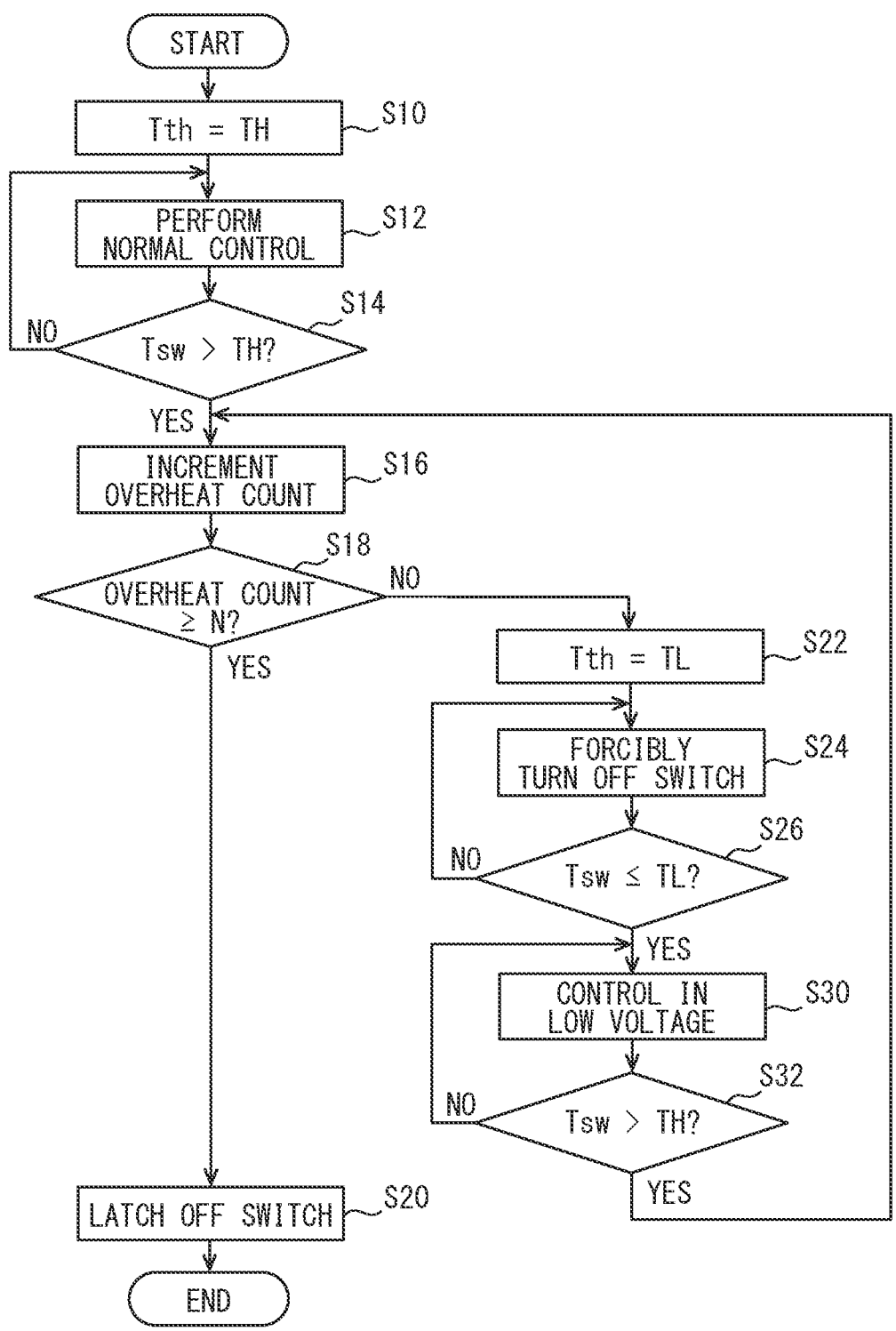
FIG. 11 is a flowchart showing processing performed by a control unit in a motor control device according to a third embodiment.

FIG. 11 is a flowchart showing processing performed by the control unit 42, and corresponds to FIG. 9. The difference from FIG. 9 is that the process of S28 is not performed, that is, the overheat detection threshold value TH is not switched. The control unit 42 has one overheat detection threshold value TH.

Therefore, in the process of S10, the overheat detection threshold value TH is set as the temperature threshold value Tth. In the process of S14, the switch temperature Tsw and the overheat detection threshold value TH are compared, and the control unit 42 determines whether the switch temperature Tsw exceeds the overheat detection threshold value TH. In S26, when the switch temperature Tsw is equal to or less than the restoration threshold value TL, the low voltage control, which is the process of S30, is performed.

Figure 12:
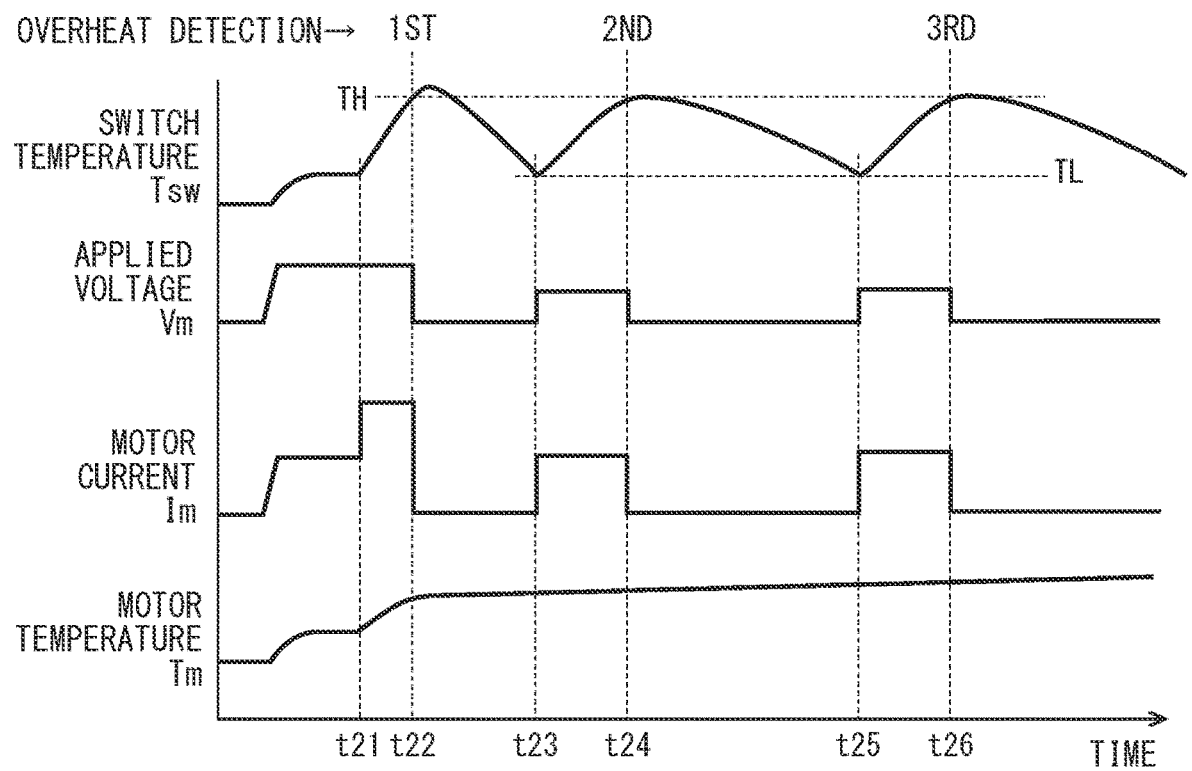
FIG. 12 is a timing chart.

FIG. 12 shows a timing chart of this embodiment. An example is shown in which an abnormality in which the motor current Im increases occurs at a time point t21 shown in FIG. 12, and this abnormality continues. The time points from t21 to t26 correspond to the time points from t11 to t16 of the preceding embodiment (see FIG. 10).

When the switch temperature Tsw exceeds the overheat detection threshold value TH at the time point t22, the switch 30 is forcibly turned off. As a result, the motor current Im is cut off, and the switch temperature Tsw falls. When the switch temperature Tsw becomes equal to or lower than the restoration threshold value TL at the time point t23, the forced off of the switch 30 is released and the low voltage control is performed. As a result, the applied voltage Vm becomes lower than the value set by the normal control. The applied voltage Vm becomes lower than that before switching. Since the applied voltage Vm becomes low, the motor current Im also becomes small.

Since the abnormality continues, the switch temperature Tsw rises again, and at a time point t24, the switch temperature Tsw exceeds the overheat threshold value TH. With this configuration, the switch 30 is forcibly turned off. As a result, the motor current Im is cut off, and the switch temperature Tsw falls. When the switch temperature Tsw becomes equal to or lower than the restoration threshold value TL again at the time point t25, the forced off of the switch 30 is released and the low voltage control is performed.

Since the abnormality continues, the switch temperature Tsw rises again, and at a time point t26, the switch temperature Tsw exceeds the overheat threshold value TH. With this configuration, the switch 30 is forcibly turned off. Similar to the period from the time point t23 to t24, the applied voltage Vm is lowered and the motor current Im is reduced in the period from the time point t25 to t26.

In the present embodiment, when a predetermined switching condition based on the switch temperature Tsw exceeding the overheat detection threshold value TH is satisfied, the control unit 42 controls the switch 30 so that the applied voltage Vm becomes lower than in the case of the normal control. The control unit 42 switches from the normal control to the low voltage control. In this way, when the switching condition is satisfied, the control unit 42 controls the switch 30 so as to continue driving the motor 11 while suppressing the electrical conduction of the motor 11 more than before the switching condition is satisfied. Therefore, the heat generation of the motor 11 can be suppressed by switching. As described above, the temperature rise of the motor 11 can be suppressed in the motor control device that is separate from the motor 11.

As described above, in the present embodiment, the switching condition is related to the number of times the switch temperature Tsw exceeds the overheat detection threshold value TH, that is, the number of times of overheat detection. For example, it is possible to set the switching condition to detect the overheat abnormality for a plurality of times. After switching to the low voltage control, the heat generation of the motor 11 can be suppressed.

In particular, in the present embodiment, when an overheat abnormality is detected once, there is possibility that the abnormality continues. Thus, the normal control is switched to the low voltage control. With this configuration, when an overheat is detected, the control can be switched to the low voltage control immediately. Therefore, when the abnormality continues, the low voltage control is performed from the restoration after the first abnormality detection. Therefore, the heat generation of the motor 11 can be effectively suppressed. That is, the temperature rise of the motor 11 can be effectively suppressed.

Other Embodiments

The disclosure in this specification and drawings is not limited to the exemplified embodiments. The disclosure encompasses the illustrated embodiments and modifications by those skilled in the art based thereon. For example, the disclosure is not limited to the combinations of parts and/or elements shown in the embodiments. The disclosure may be implemented in various combinations. The disclosure may have additional parts that may be added to the embodiments. The disclosure covers omissions of parts and/or elements of the embodiments. The disclosure covers replacement or combination of components, elements between one of the embodiments and another. The disclosed technical scope is not limited to the description of the embodiments. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

An example is shown in which the motor control device 14 is applied to the radiator fan 10, but the present application is not limited thereto. The motor control device 14 may be applied in a configuration that is separate from the motor 11.

An example is shown in which the control IC 40 including the control unit 42 is configured as an ASIC, but the present invention is not limited thereto. As a configuration in which the motor control device 14 includes a microcomputer, the microcomputer may have at least a part of the functions of the control IC 40, for example, at least a part of the functions of the control unit 42. The control unit 42 and the method therefor which have been described in the present disclosure may be also realized by a dedicated computer which constitutes a processor programmed to execute one or more functions concretized by computer programs. Alternatively, the control unit 42 and the method may be realized by a dedicated hardware logic circuit. Alternatively, the control unit 42 and the method may be implemented by one or more dedicated computers configured by a combination of a processor performing a computer program and one or more hardware logic circuits. Further, the computer program may store a computer-readable non-transitional tangible recording medium as an instruction to be performed by the computer.

The restoration condition from the forced off is that the switch temperature Tsw is equal to or less than the restoration threshold value TL, but the restoration condition is not limited thereto. The restoration condition may be an elapsed time after the switch temperature Tsw exceeds the overheat detection threshold value TH.

An example of switching the overheat detection threshold value TH in two stages has been shown, but the present disclosure is not limited thereto. The overheat detection threshold value TH may be switched in three or more stages.

An example of maintaining the second threshold value TH2 after switching from the first threshold value TH1 to the second threshold value TH2 has been shown, but the present disclosure is not limited thereto. For example, after switching to the second threshold value TH2, when the overheated state is not detected in a predetermined time, the overheat detection threshold value TH may be returned to the first threshold value TH1. Further, when the switch temperature Tsw does not rise even though the forced off is released, the threshold value may be returned to the first threshold value TH1.

The comparator included in the control unit 42 (overheat determination unit 42a) is not limited to one. For example, the overheat detection threshold value and the restoration threshold value may be used by separate comparators, or the comparators may be separated for each temperature threshold value.

An example is shown in which the switch 30 is arranged on the low side with respect to the motor 11, but the present disclosure is not limited thereto. The switch 30 may be provided in the electrical conduction path of the motor 11, in other words, the power supply path. For example, the switch may be provided on the high side.

A flowchart or a process of the flowchart described in the present disclosure includes multiple parts (or steps), and each part is expressed, for example, as S10. Furthermore, each part may be divided into multiple sub-parts, while the multiple parts may be combined into one part. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

What is claimed is:

1. A motor control device configured to control a motor and provided separate from the motor, the motor control device comprising:
   a switch provided in an electrical conduction path for the motor;
   a temperature detection unit configured to detect a temperature of the switch; and
   a control unit configured to
      control the switch between an on state and an off state,
      forcibly turn off the switch when the temperature detected by the temperature detection unit exceeds an overheat detection threshold value, thereby placing the switch in a forced off state, and
      release the forced off state of the switch when a predetermined restoration condition is satisfied, wherein
   when a predetermined switching condition is satisfied based on the detected temperature exceeding the overheat detection threshold value, the control unit continues a drive of the motor while suppressing an electrical conduction to the motor more than before the predetermined switching condition is satisfied,
   the overheat detection threshold value includes at least a first threshold value and a second threshold value having a temperature lower than the first threshold value, and
   when the predetermined switching condition is satisfied, the control unit switches the overheat detection threshold value from the first threshold value to the second threshold value.

2. The motor control device according to claim 1, wherein
   the control unit controls the switch between the on state and the off state such that a voltage applied to the motor becomes a predetermined voltage, and
   when the predetermined switching condition is satisfied, the control unit controls the switch such that the voltage applied to the motor becomes lower than the predetermined voltage.

3. The motor control device according to claim 1, wherein the motor control device is fixed, at a position away from the motor, to a support member that supports the motor.

4. The motor control device according to claim 1, wherein
   when the predetermined switching condition is satisfied based on the detected temperature exceeding the first threshold value, the control unit
      sets a restoration threshold value that is lower than the first threshold value and
      forcibly turns off the switch, and
   when the predetermined restoration condition is satisfied based on the detected temperature being equal to or less than the restoration threshold value, the control unit
      switches the overheat detection threshold value to the second threshold value and
      releases the forced off state of the switch.

5. The motor control device according to claim 1, wherein
   the control unit continuing the drive of the motor while suppressing the electrical conduction to the motor includes stopping the motor for a period of time during the forced off state and operating the motor for a shorter period of time in the on state after the forced off state is released.

6. The motor control device according to claim 5, wherein
   when the predetermined switching condition is satisfied based on the detected temperature exceeding the first threshold value, the control unit
      sets a restoration threshold value that is lower than the first threshold value and forcibly turns off the switch, and when the predetermined restoration condition is satisfied based on the detected temperature being equal to or less than the restoration threshold value, the control unit switches the overheat detection threshold value to the second threshold value and releases the forced off state of the switch.

7. A motor control device configured to control a motor and provided separate from the motor, the motor control device comprising:

a switch provided in an electrical conduction path for the motor;

a temperature detection circuit configured to detect a temperature of the switch; and a control circuit configured to control the switch between an on state and an off state, forcibly turn off the switch when the temperature exceeds an overheat detection threshold value, thereby placing the switch in a forced off state, and release the forced off state of the switch when a predetermined restoration condition is satisfied, wherein when a predetermined switching condition is satisfied by the detected temperature exceeding the overheat detection threshold value, the control circuit continues a drive of the motor while suppressing an electrical conduction to the motor more than before the predetermined switching condition is satisfied, the overheat detection threshold value includes at least a first threshold value and a second threshold value having a temperature lower than the first threshold value, and when the predetermined switching condition is satisfied, the control circuit switches the overheat detection threshold value from the first threshold value to the second threshold value.

8. The motor control device according to claim 7, wherein when the predetermined switching condition is satisfied by the detected temperature exceeding the first threshold value, the control circuit sets a restoration threshold value that is lower than the first threshold value and forcibly turns off the switch, and when the predetermined restoration condition is satisfied by the detected temperature being equal to or less than the restoration threshold value, the control unit switches the overheat detection threshold value to the second threshold value and releases the forced off state of the switch.

9. The motor control device according to claim 7, wherein the control unit continuing the drive of the motor while suppressing the electrical conduction to the motor includes stopping the motor for a period of time during the forced off state and operating the motor for a shorter period of time in the on state after the forced off state is released.

10. The motor control device according to claim 9, wherein when the predetermined switching condition is satisfied by the detected temperature exceeding the first threshold value, the control circuit sets a restoration threshold value that is lower than the first threshold value and forcibly turns off the switch, and when the predetermined restoration condition is satisfied by the detected temperature being equal to or less than the restoration threshold value, the control unit switches the overheat detection threshold value to the second threshold value and releases the forced off state of the switch.

* * * * *